Jan. 13, 1970 E. B. McDOWELL 3,490,048

CLAMPING CIRCUIT FOR REGISTER CONTROL

Filed May 7, 1965 4 Sheets-Sheet 1

INVENTOR.
EARLE B. McDOWELL

BY W. J. Shanley, Jr.
HIS ATTORNEY

INVENTOR.
EARLE B. McDOWELL
BY W. J. Shanley, Jr.
HIS ATTORNEY

CLAMPING CIRCUIT FOR REGISTER CONTROL

Filed May 7, 1965 4 Sheets-Sheet 3

INVENTOR.
EARLE B. McDOWELL
BY W. J. Shanley, Jr.
HIS ATTORNEY

Jan. 13, 1970 E. B. McDOWELL 3,490,048

CLAMPING CIRCUIT FOR REGISTER CONTROL

Filed May 7, 1965

4 Sheets-Sheet 4

INVENTOR.
EARLE B. McDOWELL
BY W. J. Shanley, Jr.
HIS ATTORNEY

United States Patent Office 3,490,048
Patented Jan. 13, 1970

3,490,048
CLAMPING CIRCUIT FOR REGISTER CONTROL
Earle B. McDowell, Waynesboro, Va., assignor to General Electric Company, a corporation of New York
Filed May 7, 1965, Ser. No. 453,946
Int. Cl. H03k 5/08
U.S. Cl. 328—168 5 Claims

ABSTRACT OF THE DISCLOSURE

A register control for controlling the relationship between a moving web and a cutter element acting on the web includes means for sequentially generating a "lead zone" signal during an interval immediately preceding the cutting action, a scanner signal in response to detection of a preprinted register mark on the web, and a "lag zone" signal during an interval immediately subsequent to the cutting action. The scanner signals are generated by a photoelectric scanner and are supplied to an amplifier to produce an amplified output signal to maintain synchronism between the web and the cutter element. The "lead" and "lag" signals control the condition of the amplifier such that the amplifier performs its normal amplifying function during the time interval between the beginning of the "lead zone" and the end of the "lag zone," and is clamped to a substantially zero output level at other times to prevent amplification of false signals detected by the scanner during such other times.

Figure 1:
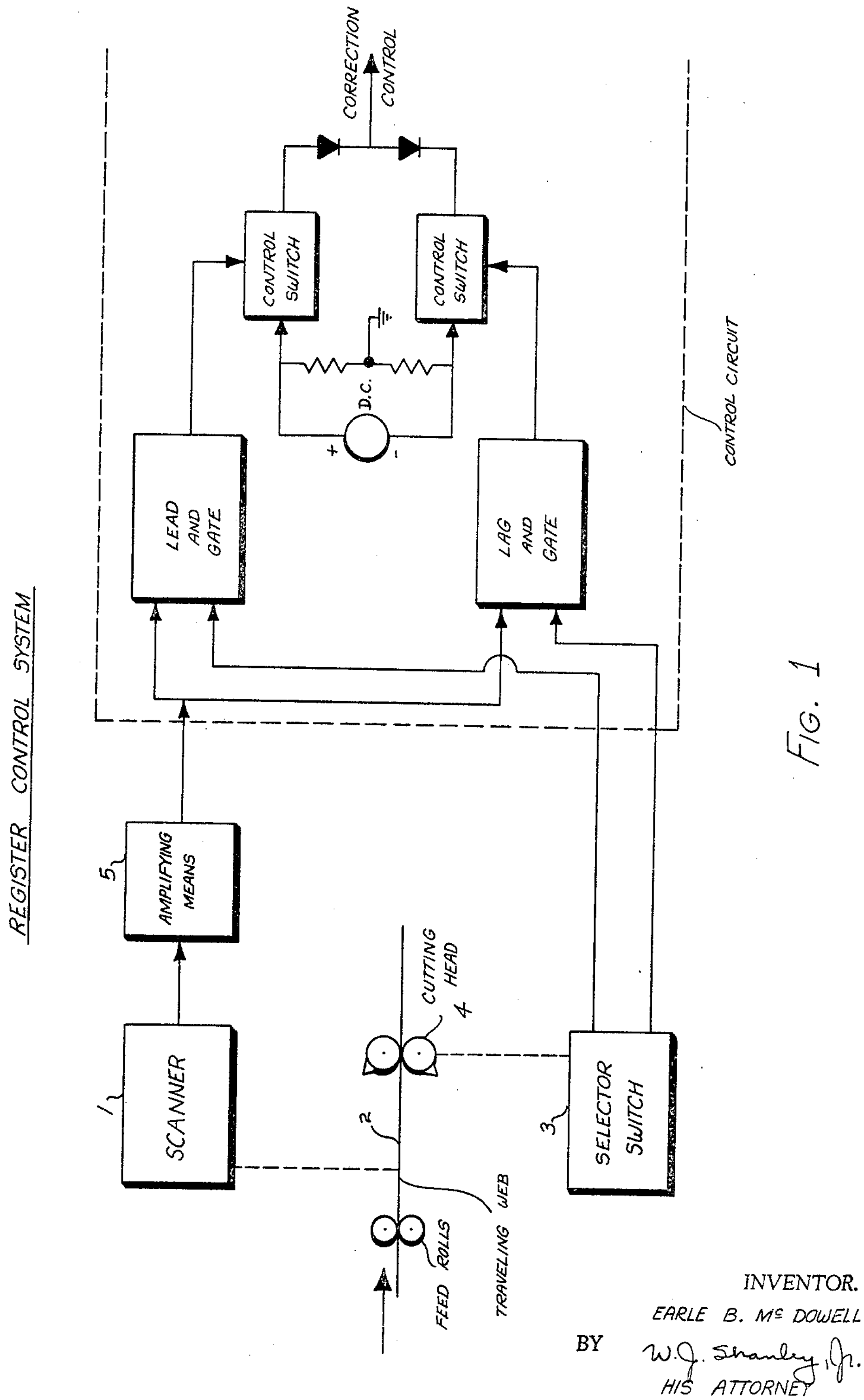

The present invention relates to amplifiers and more specifically to improved amplifiers having means for permitting the amplifier to be responsive to input signals only during a predetermined time interval. In this way signals applied to the amplifier outside of such predetermined time interval will find the amplifier non-responsive since means are provided for maintaining the amplifier output at a substantially zero level during this period to prevent the amplifier from responding to "false" signals.

Amplifiers of this type are used in web register control systems wherein a photoelectric head is used for scanning a traveling web for preprinted register marks placed at predetermined intervals thereon. Upon detection of a preprinted register mark, a signal is generated by the photoelectric head and this signal when amplified, is used to maintain synchronism between the traveling web and a rotatable cutting head operating on the traveling web to sever predetermined lengths of material therefrom. A further requirement is that the amplifier used must not be responsive to signals generated by the photoelectric head in response to marks other than the preprinted register marks detected on the traveling web. The amplifier output should be maintained or "clamped" to a substantially zero level when marks other than preprinted register marks are detected by the photoelectric head so that negligible output signals are produced by the amplifier. These preprinted register marks are placed at predetermined intervals on the moving web, which intervals correspond to a predetermined angular position of a rotating selector switch. The selector switch conveniently supplies the signals which control the initiation and duration of the predetermined time interval for clamping the amplifier output.

Therefore, one object of the present invention is to provide a means for clamping the output of an amplifier to a substantially zero level for the duration of a predetermined interval, during which false input signals may occur.

Another object of the present invention is to provide a means for controlling an amplifier so that it is responsive only to input signals occurring during a predetermined time interval.

Another object of the present invention is to provide a clamping means which will accommodate both positive and negative outputs from the amplifier.

A still further object of the present invention is to provide an amplifier wherein clamping means are provided for maintaining amplifier output at a substantially zero level during a predetermined interval, but which amplifier is rapidly restored to normal operation at the end of the predetermined interval.

Briefly, the present invention contemplates maintaining an amplifier output at a substantially zero level by utilizing a feedback network, which, in response to the selector switch angular position supplies a negative feedback signal to the amplifier input whereby the negative feedback signal effectively "clamps" the amplifier output or maintains the amplifier output at a substantially zero level.

Additional objects and advantages of the present invention together with a better understanding thereof may be had by referring to the following detailed description of a preferred embodiment of the present invention along with the accompanying drawings.

FIG. 1 is a block diagram of the over-all register control system in which the present invention may have particular utility.

Figure 2:
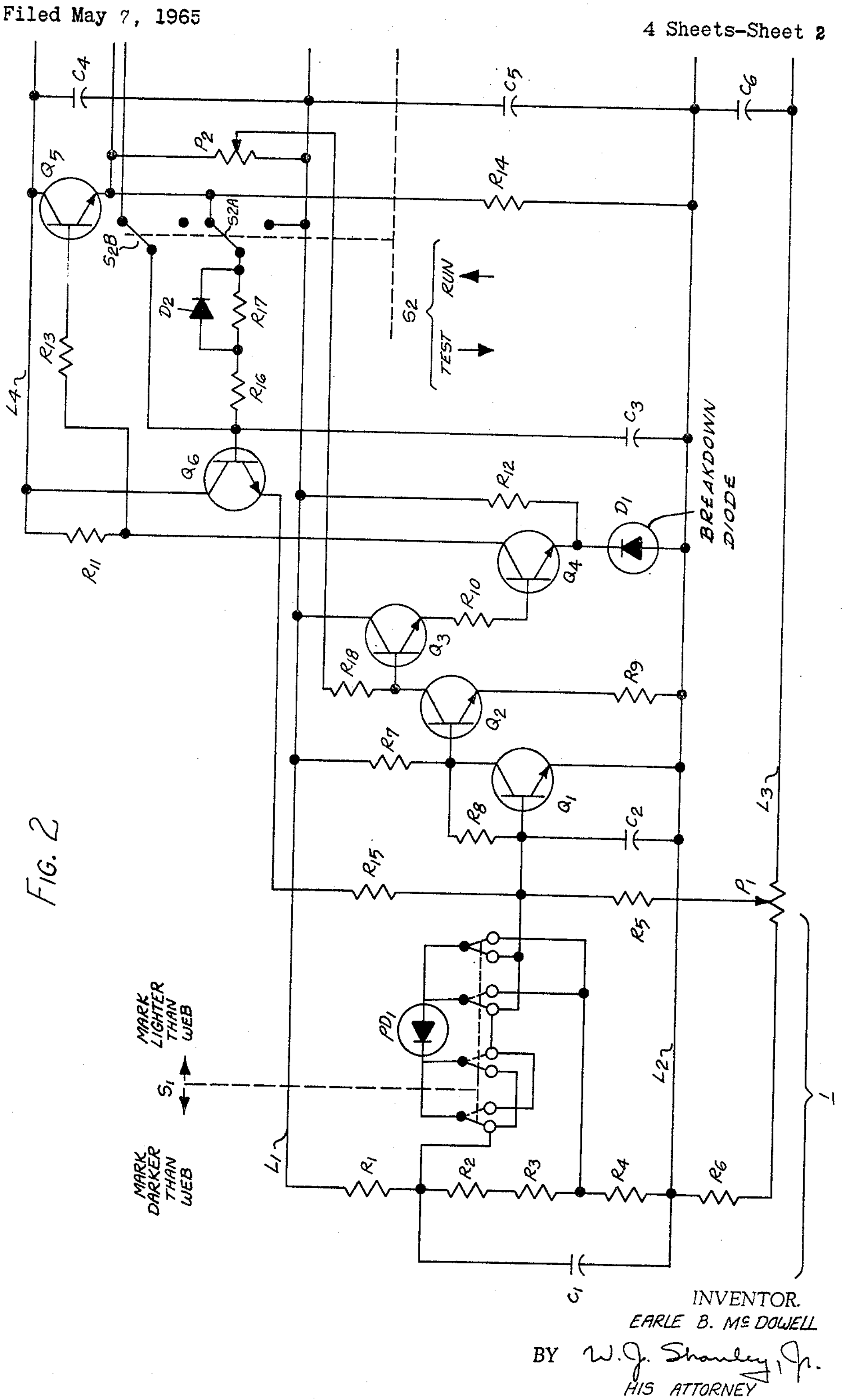
Figure 2A:
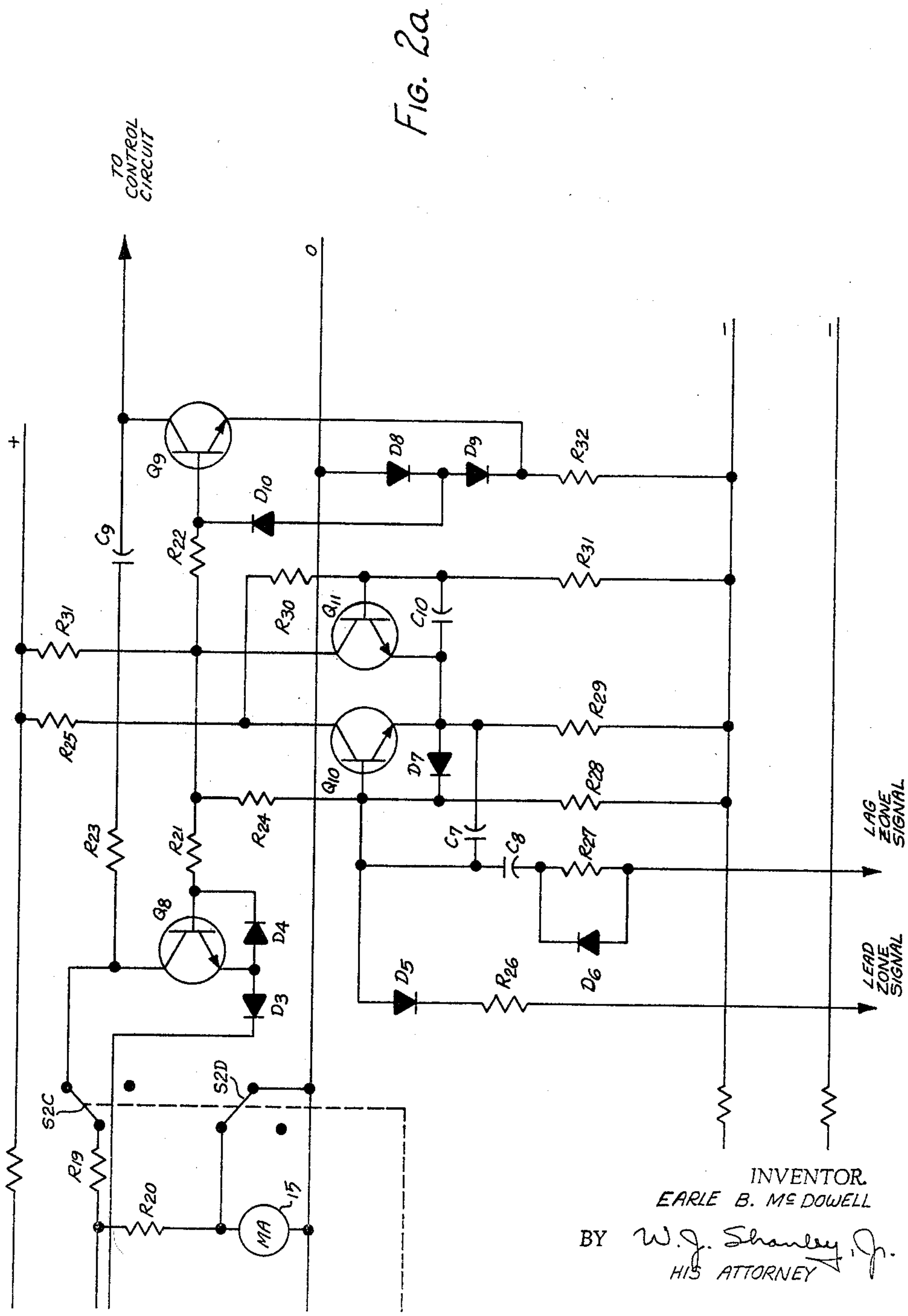

FIGS. 2 and 2*a* are a schematic diagram of an amplifying means in accordance with the present invention.

Figure 3:
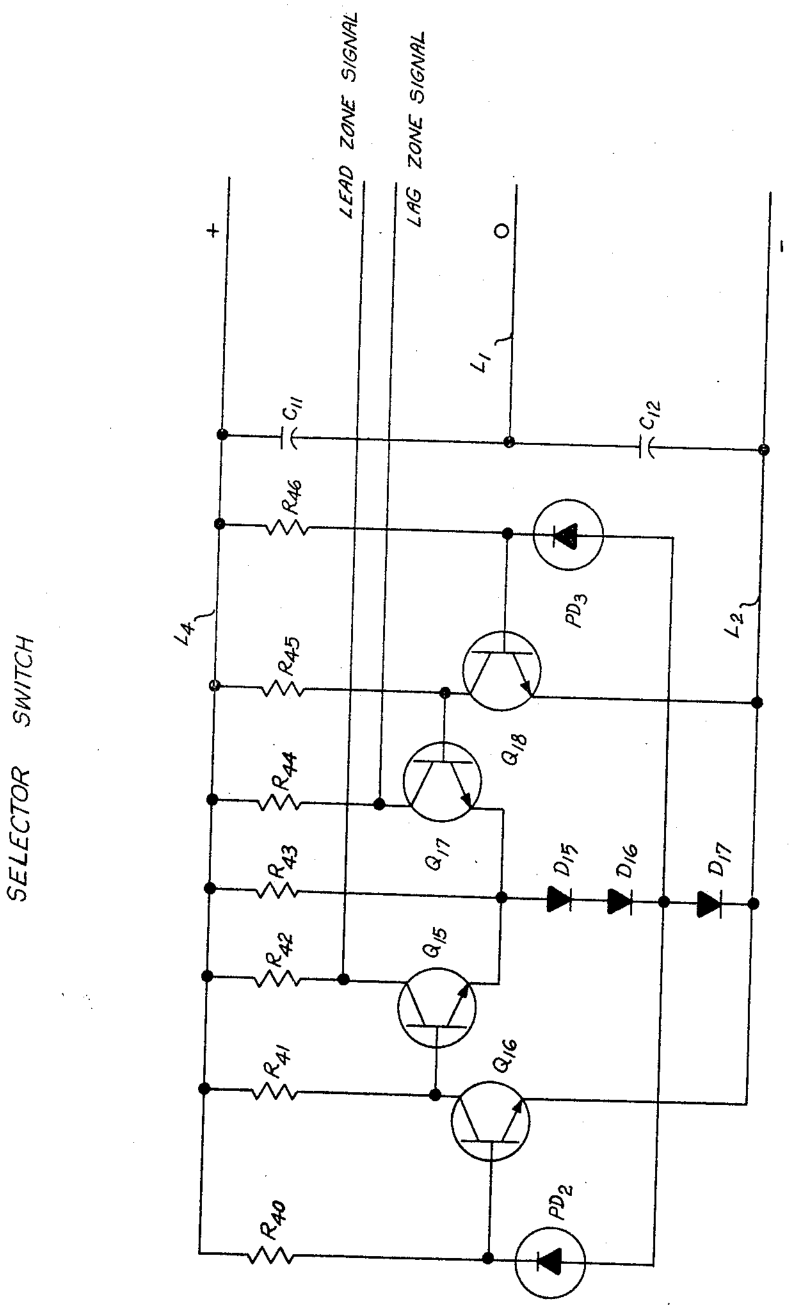

FIG. 3 is a schematic diagram of a means for generating lead and lag zone signals in FIG. 2.

Referring now to FIG. 1 where there is shown a block diagram of the over-all register control system of which the present invention may be used, there is shown a scanner, which in this instance comprises a photoelectric head, which is responsive to the position of a traveling web. Register marks placed at predetermined intervals on the web, are detected by the scanner, and cause an electrical signal to be generated.

Also shown is a selector switch which is responsive to the position of the rotatable cutting head used to sever predetermined lengths of material from the web. During an angular interval immediately preceding the cutting of material from the web, and an angular interval immediately subsequent to the cutting of the material from the web, electrical signals are generated by the selector switch. A first or "lead zone" signal is generated during the interval immediately preceding the cutting of the web and is so called because if the material were cut during this interval, the cutting would occur too soon and the cutting head would be ahead of its corresponding position on the traveling web; hence, the cutting head would be leading the traveling web.

Similarly, the second or "lag zone" signal is generated during the interval immediately subsequent to the cutting of the material and if the cutting of the material were to take place during this interval, the cutting head 4 would be behind its corresponding position on the traveling web; hence, the cutting head would be lagging the traveling web.

The scanner signal is supplied to an amplifying means 5 where the signal level is raised to a level sufficient for further control functions in the system. It is desirous to maintain or clamp the amplifying means output to a substantially zero level except during the time interval between the beginning of the lead zone and the end of the lag zone. The duration of this time interval will subsequently be called the active zone, and the remaining interval will be called the inactive zone. The system is designed so that the amplifying means is unclamped at the beginning of the active zone and reclamped at the end of the active zone to ensure that signals occurring during the inactive zone are not amplified. As it will be shown later, even though an output signal developed during the inactive zone cannot pass through the gating system, it would be possible without a clamp to have a signal occurring immediately before the beginning of the active zone to be carried over into the active zone and disturb the normal operation of the amplifier.

The over-all purpose of the register control system is to scan the position of the traveling web and compare it with the positition of the cutting head. If the traveling web is ahead or behind where it should be at any moment in time, a corresponding correction is made. Specifically, the scanning head 1 is connected to an amplifying means 5 which raises the level of the signal to a value sufficient for further control of the circuit. The output of the amplifying means 5 is connected to the first of two input terminals on each of first (lead) and second (lag) "and" gates. For purposes of a better understanding of the present invention, the first "and" gate will hereinafter be referred to as the lead "and" gate as it is to this "and" gate that a lead zone signal is supplied. Similarly, the second of the two "and" gates will be referred to the lag "and" gate as it is to this "and" gate that the lag zone signal is supplied.

Any lead zone signal from the selector switch 3 is supplied to the second of the two input terminals on the lead "and" gate and any lag signal is supplied to the second of the two input terminals on the lag "and" gate. Ideally, the sequence of the occurrence of the signals is as follows: lead zone signal, scanning signal, and lag zone signal. When the predetermined relationship between the cutting head 4 and the traveling web 2 exists, there is no overlap in the occurrence of any two of the signals on either the lead or lag "and" gates. However, where there is an overlap in the occurrence of the signals, it is a result of an error in the system. When either of the two "and" gates has a simultaneous occurrence of two signals on its input terminals, an output signal is generated which output signal is supplied to a control switch to close the control switch and connect a voltage source of a proper polarity to the control circuit to correct for any error in the system.

Turning now to FIG. 2 and a detailed description of the present invention, as previously stated it is the purpose of the present invention to provide means for precluding the register system from being responsive to signals from the traveling web which occur during the inactive zone. Means are provided for generating electrical signals which are used to determine the relative position of the traveling web 2. This means is responsive to register marks occurring on the web and includes a first circuit comprising series connected resistors R1, R2, R3 and R4. Shunting the latter three resistors R2, R3 and R4 is a capacitor C1. A photodiode PD1 is connected to a four pole double throw switch S1 in such a manner that when the switch is in its first position, the cathode of the photodiode PD1 is connected to the junction between resistors R1 and R2 and the anode is connected to the input of the amplifying means 5. In the second of the two positions of the switch S1, the anode of the photodiode is connected to the junction between resistors R3 and R4 and the cathode is connected to the input of the amplifying means 5. Switch S1 compensates for lighter or darker backgrounds of the web to the register mark and, when in its proper position, ensures a positive output from the amplifying means 5.

The specific structurde of the amplifying means 5 which is used for raising a signal from the scanner to a level which is sufficient for subsequent control functions includes a first amplifying stage comprising a transistor Q1 having its base connected through a current limiting resistor R5, potentiometer P1, and voltage divider resistor R6 to a first source of negative potential L2. The potentiometer P1 has its opposite end connected to a second source of negative potential L3 which is of a lower value than the first source L2. Variable settings of the potentiometer P1 allow the control of bias voltage to vary the current supplied to the base of the transistor Q1 through resistor R5. A capacitor C2 is connected between the base and the emitter of transistor Q1 and is used to filter out interfering signals which may be induced into the base of transistor Q1. The emitter of transistor Q1 is connected to the first source of negative potential L2 and the collector of transistor Q1 is connected through a limiting resistor R7 to a zero potential reference L1. A resistor R8 is connected between the collector and the base of transistor Q1 to provide a negative feedback therebetween.

The collector of transistor Q1 is also connected to the base of a transistor Q2 in a succeeding amplifying stage of the amplifier 5. The emitter of transistor Q2 is connected through a bias resistor R9 to the first source of negative potential L2 and the collector of transistor Q2 is connected to the base of a transistor Q3 in the next stage of the amplifier. The collector of transistor Q3 is connected to the zero potential reference L1 and the emitter of transistor Q3 is connected through a current limiting resistor R10 to the base of transistor Q4 in a fourth amplifying stage. The emitter of Q4 is connected through a breakdown diode D1 to the first source of negative potential L2 while its collector is connected through a load resistor R11 to the source of positive potential L4. The emitter of transistor Q4 is also connected through a load resistors R12 to the zero potential reference L1 and its collector is also connected through a current limiting resistor R13 to the base of a transistor Q5 in the output stage of the amplifier. The collector of transistor Q5 sis connected to the source of positive potential L4 and its emitter is connected through an emitter follower resistor R14 to the first source of negative potential L2. It is across this emitter follower resistor R14 that the output of the amplifier is taken.

The means which are used to supply the negative feedback signal to the input of the amplier whereby the output of the amplier is maintatined at a substantially zero level when a signal occurs during the inactive zone include a transistor Q6. The collector of transistor Q6 is connected to the source of positive potential L4 and the emitter of transistor Q6 is connected through a feedback resistor R15 to the base of transistor Q1, the input stage of the amplifier 5. The base of transistor Q6 is connected through a capacitor C3 to the source of negative potential L2 and a pair of series connected time delay resistors R16 and R17 to a movable contact S2A on a second four pole, double throw switch S2. The base of the transistor Q6 is also connected to a second movable contact S2B on the switch S2. Connected in parallel with the resistor R17 is a diode which upon being rendered conductive is effective to shunt the resistor R17.

In order to adjust the gain of the amplifier, means are provided for supplying a negative feedback signal to the input of transistor Q3. The emitter of transistor Q5 is connected to one end of a potentiometer P2 with the other end of the potentiometer being connected to the zero potential reference L1. The variable slider arm 10 on the potentiometer P2 is connected through a current limiting resistor R18 to the base of the transistor Q3.

Filter capacitors C4, C5 and C6 are connected between the four voltage supply lines; the first capacitor C4 being disposed between the source of positive potential L4 and the zero potential reference L1, the second capacitor C5 being disposed between the zero potential reference L1 and the first source of negative potential L2, and the third capacitor C6 being disposed between the first source of negative potential L2 and the second source of negative potential L3.

The output of the amplifier is taken across the emitter follower resistor R14 and is connected through a series current limiting resistor R19 to a third movable contact S2C on the switch S2. The switch S2, in its first or "run" position, connects the base of transistor Q6 through a diode D3 to the emitter of a transistor Q8 and a clamping circuit to be described in detail hereinafter. The switch S2 in its first position also connects, through movable contact S2A, the current limiting resistors R16 and R17 to the emitter of transistor Q5. Emitter of Q5 is also connected through a series resistor R19 and to the collector of the transistor Q8 and resistor R23.

An ammeter 15, provided for calibration of the circuit, has its first terminal connected to the zero reference L1 and its second terminal connected through a series resistor R20 to the amplifier output. With the switch S2 in the first position, a fourth movable contact S2D on the switch S2 connects the junction between the resistor R20 and the ammeter to the zero reference L1 whereby the ammeter is shunted and thereby protected.

With the switch S2 in its second or "test" position, the circuit is calibrated whereby the switch S2 disconnects the base of transistor Q6 from the emitter of transistor Q8, disconnects resistor R17 from the emitter of transistor Q5 and connects the resistor R17 to the zero potential reference L1, disconnects series resistor R19 from the collector of transistor Q8, and opens the shunting circuit across the ammeter whereby the ammeter is serially connected between the series resistor R20 and the zero potential reference L1.

When calibrating, the potentiometer P1 should be adjusted so that the ammeter 15 reads zero when no register mark is detected and potentiometer P2 should be adjusted so that the ammeter 15 reads full scale for the detection of a register mark.

The means for clamping and unclamping the amplifier, whereby any output from the amplifier which occurs when the amplifier is clamped is supplied to the negative feedback means, includes the transistor Q8 which upon being rendered conductive connects the amplifier output to the base of the negative feedback transistor Q6 through resistor R19 and diode D3. Connected between the base and the emitter of transistor Q8 is a diode D4 with its anode connected to the emitter. This diode D4 serves as a protective device to prevent an excessive negative voltage from being applied to base of Q8. Also connected to the base of the transistor Q8 is a current limiting resistor R21 which is connected to a second current limiting resistor R22 which in turn is connected to the base of a second transistor Q9, the collector of which is connected to the collector of transistor Q8 through a blocking capacitor C9 and input resistor R23.

When the amplifier 5 is utilized in a web register control system, the output of the amplifier may be taken from the junction of the transistor Q9 and the capacitor C9 and supplied to a control (not shown) for correcting the position of the web.

Continuing with the description of the "clamping" circuit, a pair of transistors Q10 and Q11 are connected in a flip-flop configuration whereby the output of transistor Q11 is connected to the base of transistor Q8 through resistor R21 and is effective to control the conduction state thereof. Specifically, the junction between the resistors R21 and R22 and collector of Q11 is connected through a resistor R24 to the base of a transistor Q10, the collector of which is connected through a load resistor R25 to the source of positive potential L4 to provide a "locking" circuit for the transistor. The base of transistor Q10 is also connected through a diode D5 and series connected resistor R26 to a source of lead zone signals. The diode D5 is poled to block any positive signal from being supplied to the base of transistor Q10. The base of transistor Q10 is also connected through a capacitor C8 and resistor R27 to a source of lag zone signals. Shunting the resistor R27 is a diode D6 which is conducting for positive signals from the lag zone signal generator. Connected between the emitter and the base of transistor Q10 is a diode D7 and also a capacitor C7. The base of the transistor Q10 is connected through a bias resistor R28 to the source of negative potential L2 and in a similar manner the emitters of transistor Q10 and Q11 are connected through a bias resistor R29 to the source of negative potential L2.

The collector of transistor Q10 is connected through a bias resistor R30 to the base of an associated transistor Q11, the collector of which is connected through the junction of the resistors R21 and R22 and through a load resistor R31 to the source of positive potential L4. Connected between the base of the transistor Q11 and the emitter thereof is a capacitor C10. Connected between the base of the transistor Q11 and the source of negative potential is a bias resistor R31.

A pair of series connected diodes D8 and D9 and series resistor R32 are connected between the zero potential reference L1 and the source of negative potential L2. The junction between the two diodes D8 and D9 is connected through a diode D10 to base of Q9. The junction between the diode D9 and resistor R32 is connected to the emitter of the transistor Q9.

In the operation of the photoelectric scanner and amplifier with switch S1 in position shown, a register mark is detected by photodiode PD1 which, upon detection thereof, decreases its conduction in the case of a mark darker than the web. When the conduction of photodiode PD1 is reduced, the current flowing into the base of transistor Q1 is also reduced. With less current flowing into the base of transistor Q1, transistor Q1 becomes less conducting and a positive signal exists at its collector which positive signal is supplied to the base of transistor Q2 to cause transistor Q2 to increase its conduction. The increase in conduction of transistor Q2 causes the potential o f its collector to decrease, thereby causing a decrease in the current flowing into the base of transistor Q3, and the base of transistor Q4. The resulting decrease in the collector current of transistor Q4 causes its collector voltage to rise, which, said voltage, is supplied to the base of transistor Q5 through resistor R13 to cause transistor Q5 to increase its conduction. With transistor Q5 conducting, a positive signal is generated across the emitter follower resistor R14 which signal, when the amplifier output is unclamped, is supplied through resistor R19 to control circuit which is used for synchronizing the relationship between the traveling web and the cutting head.

This output voltage also appears across potentiometer P2 whose sliding arm is connected through resistor R18 to the base of transistor Q3 to supply negative feedback current thereto. By adjusting the position of the sliding arm, the amount of feedback supplied to the base of transistor Q3 is varied and thus the gain in the latter stages of the amplifier is controlled.

For positive amplifier outputs a register mark generates a signal which is supplied to the amplifier input in response thereto. This signal will always occur during the active zone in the unclamped condition with transistor Q8 nonconducting. In addition to being transmitted to the control circuit the output signal at the emitter of Q5 is also applied to the feedback circuit, comprising resistors R15, R16 and R17, capacitor C3, diode D2 and transistor Q6. Since the diode does not conduct with positive signals, the portion of the signal voltage applied to the base of transistor Q6 is determined by the time constant of capacitor C3 and resistors R16 and R17. Since this active zone feedback time constant is much longer than the time duration of the register mark signal, a negligible amount of the signal voltage is applied to the base of transistor Q6 and consequently negligible negative feedback is produced.

For all positive signals which occur during the inactive zone, which signals are termed "false," the transistor Q8 will be in a conducting state, and a clamping action takes place. This output voltage is now fed back to the base of transistor Q6 through resistor R19, transistor Q8 and diode D3. This feedback circuit is in shunt with feedback resistors R16 and R17. Since resistor R19 is very small compared to the sum of resistors R16 and R17, the inactive zone feedback time constant is determined by resistor R19 and capacitor C3 and is conequently much shorter than the previously described active zone feedback time constant. The effect of this short ime constant is to permit a feedback signal to occur for ubstantially all positive signals which occur during the nactive zone. A false signal whose rise or fall time is hort with respect to the feedback time constant can produce an amplified pulse of correspondingly short duraion at the amplifier output. However, since this output occurs during the inactive zone, the lead and lag "and" gates described previously will prevent this pulse from being transferred to the control. Furthermore with the usual printing and other marks on the web the rise or fall times of the input signals are not short and for all practical purposes the output remains at substantially zero.

For negative output signals, short time constant feedback is in existance continuously during both active and nactive zones. The diode D2 shunts resistor R17 for all negative amplitude signals. Since this leaves only resistor R16, which is a very low value, in the time constant circuit, the feedback time constant becomes very short. In the actual circuit resistors R16 and R19 are equal which results in the short time constant feedback for all positive and negative signals during the inactive zone and negative signals only during the active zone.

The negative clamp is required during the inactive zone because the input signals can be in a form which could produce either a positive or negative output. Therefore, the output must be clamped for both polarity signals to maintain substantially zero output.

The negative clamp is not essential for the register mark signals during the active zone. However, since only positive signals are utilized, the negative clamp is not detrimental and thus is retained in the circuit durng ths interval.

For calibrating the system, the switch S2 is turned to the test position whereby the amplifier output is disconnected from the control circuit and a milliammeter L5 inserted in series with resistor R20 between the emitter of transistor Q5 and zero potential reference L1. Further, the feedback transistor Q6 is also connected to the zero potential reference L1.

Means for producing a lead or lag zone signal during which period of time the amplifier output is unclamped are illustrated in FIG. 3. This means includes filter capacitors C11 and C12, which are connected between the sources of voltage L4 and L2 and the zero potential reference L1. Also connected between the positive L1 and negative L2 sources of voltage is a series circuit comprising a resistor R43 and series connected diodes D15, D16 and D17. Connected to the junction between the resistor R43 and diode D15 is the emitter of a transistor Q15 the collector of which is connected through a bias resistor R42 to the source of positive potential L4. It is noted that the lead zone signal is taken from the collector of this transistor Q15. The base of transistor Q15 is connected to the collector of a transistor Q16 the emitter of which is connected to the source of negative potential L2. The collector of transistor Q16 is connected through a bias resistor 41 to the source of positive potential L4 and its base is connected to the junction between a resistor R40 and a photodiode PD2, the other end of which is connected to the junction of the diodes D16 and D17. The amount of light impinging on the photodiode PD2 is used for controlling the generation of the lead zone signal.

In like manner, the means for generating a lag zone signal includes a transistor Q17 the emitter of which is connected to the junction between the diode D15 and resistor R43 and whose collector is connected through a bias resistor R44 to the source of positive potential L4. The lag zone signal is taken across the collector of transistor Q17. The base of transistor Q17 is connected to the collector of a transistor Q18, the emitter of which is connected to the source of negative potential L2. The collector of the transistor Q18 is also connected through a bias resistor R45 to the source of positive potential L4 and the base of transistor Q18 is connected to the junction of a resistor R46, the other end of which is connected to the source of positive potential L4, and a photodiode PD3, the other or which is connected to the junction of the diodes D16 and D17. As occurs in the lead zone signal, the amount of light impinging on photodiode PD3 is used to control the generation of the lag zone signal.

The lead zone signal is supplied through the resistor R26 of FIG. 2, which is connected through diode D5, to the base of transistor Q10. The lag zone signal is likewise supplied through the resistor R27 and through capacitor C8, to the base of transistor Q10. In the operation of the circuit of FIG. 3, of the present invention, a lead zone signal is generated whenever light, from a separate light source (not shown), impinges on the forward diode PD2. Normally no light falls on the photodiode PD2 as an opaque rotatable member (not shown) whose rotation is synchronized with the rotating cutting head is disposed between the separate light source and the photodiode PD2. However, slots are cut in this opaque member for the interval which corresponds to the lead zone and lag zone and during this interval light from the light source impinges on the photodiode PD2 and photodiode begins conducting to shunt the base of transistor Q16. As current no longer flows in the base of transistor Q16, transistor Q16 becomes nonconducting and consequently transistor Q15 becomes conducting. With transistor Q15 conducting, the output taken thereacross approaches a source of negative potential L2 and is separated therefrom only by the forward drops in the conducting diodes D15, D16 and D17. This output remains negative until the photodiode PD2 again becomes nonconducting at which time the output across transistor Q15 will return to its original value which approaches that of the source of positive potential L4.

A lag zone signal is similarly created and its output voltage is also negative when light impinges on the photodiode PD3. When photodiode PD3 is nonconducting, as occurs at the end of the lag zone, the output across transistor Q17 again approaches the source of positive potential L4. Specifically, in order to unclamp the amplifier output a lead zone signal is supplied to the base of transistor Q10 which, upon being made negative with respect to its emitter causes the transistor Q10 to be nonconducting. With transistor Q10 nonconducting a positive voltage appears at the collector of transistor Q10 which is supplied to the base of transistor Q11 through resistor R30 to cause current to flow into the base of transistor Q11 and thereby cause transistor Q11 to become conducting. With transistor Q11 conducting, a negative signal exists at the collector of transistor Q11. This negative signal is coupled through resistor R24 back to the base of transistor Q10 to maintain transistor Q10 nonconducting. Further, this negative signal on the collector of transistor Q11 is supplied through resistor R21 to the base transistor Q8 and through resistor R22 to the base of transistor Q9 so as to maintain each of these transistors in a nonconducting state. With these transistors Q8 and Q9 nonconducting, the amplifier output is unclamped and connected directly to the control circuit. It is during this period of time that a register mark signal is supplied along with the lag and lead zone signals to the "and" gates to ascertain whether or not the traveling web and the cutting head are in synchronism.

With the amplifier output unclamped, any positive output from the amplifier is supplied to the control circuit so that the control circuit will be responsive thereto. At the termination of the lead signal, diode D5 blocks the positive signal from being supplied to the base of transistor Q10 which would cause transistor Q10 to be conducting. The lag zone signal is generated in a manner identical with that of the lead zone signal and it is supplied to the base of transistor Q10 through current limiting resistor R27 and capacitor C8. Since the pulse developed at the beginning of lag signal is negative, no change in the state of transistor Q10 occurs and the amplifier output remains unclamped and any positive output from the amplifier is supplied to the control circuit. During this period of time transistors Q8 and Q9 remain in a nonconducting state.

At the termination of the lag zone signal, light ceases to fall on photodiode PD3 and the photodiode PD3 becomes nonconducting. With photodiode PD3 nonconducting, current now flows in the base of transistor Q18 causing the conduction thereof which in turn causes the nonconduction of Q17 and a positive signal to appear at the collector of Q17 which positive signal is supplied to the base of transistor Q10 through diode D6 and capacitor C8. With a positive signal supplied to the base of transistor Q10, transistor Q10 becomes conducting and upon becoming conducting, a negative signal appears at the collector of transistor Q10 which is supplied through resistor R30 to the base of transistor Q11 to cause transistor Q11 to become nonconducting. As transistor Q11 is nonconducting, a positive signal appears at the collector of transistor Q11 which is supplied through resistor R24 to the base of transistor Q10 to maintain transistor Q10 in a conducting state. Further, this positive signal is also supplied to the base of transistor Q8 through resistor R21 and to the base of transistor Q9 through resistor R22 to maintain both of these transistors in a conducting state.

When transistor Q8 is conducting, a path exists from the amplifier output through a limiting resistor R19, through the conducting transistor Q8, and through forward biased diode D3 to the base of the feedback transistor Q6. Any positive signal generated during this period of time will be supplied to the base of transistor Q6 through this path.

Further, if any negative signal occurs during this period of time, it will be fed through shunting diode D2 and resistor R16 to the base of the transistor Q6. As the value of resistor R16 is identical with that of resistor R19, it can be seen that identical paths are provided for either a positive or negative signal which is detected during the period when the output of the amplifier is clamped to thereby enable the amplifier through the feedback means to maintain its output at a substantially zero level. Further, this negative signal path is always provided whereas the path for a positive signal only occurs when the amplifier output is unclamped. Thus, the amplifier is "gated" to a clamping condition by a positive signal from the selector switch.

Therefore, it can be seen that the present invention provides a means for maintaining the amplifier output at a substantially zero level at all times except during predetermined active time intervals when the system is determining whether or not the web and cutting head are in synchronism. The system further provides a continuous negative clamp as well as a gated positive clamp. Furthermore, the clamping means enable the rejection of false signals which may occur immediately before the beginning of the predetermined active time interval, so that false output signals will not be carried over to disturb the normal operation of the amplifier.

While I have shown and described a particular embodiment of the present invention, it will be obvious to those skilled in the art that various changes and modifications may be made without departing from the present invention in its broader aspect and therefore it is the intention of the appended claims to cover all such changes and modifications as fall within the true spirit and scope of the present invention.

What I claim as new and desire to secure by Letters Patent of the United States is:

1. In a register control system for controlling the relationship between a moving web and an element operating thereon: means for generating first electrical signals in response to the detection of identifying marks on the moving web, means coupled to said generating means for amplifying said electrical signals, said amplifying means having a negative feedback circuit coupled between its input and output circuits, means for generating second electrical signals when said moving web bears a predetermined position with respect to said generating means, and means responsive to said second electrical signals for modifying said feedback circuit so as to cause the output of said amplifying means to be maintained at a substantially zero level.

2. The combination of claim 1 in which said feedback circuit includes an RC network, said network having a time constant which is long with respect to the period of said first electrical signals whereby said amplifying means responds to said first electrical signals.

3. The combination of claim 2 in which said modifying means comprises a second RC network, and switching means responsive to said second electrical signals for connecting said second RC network into said feedback circuit so as to render the RC time constant of the feedback circuit short with respect to the period of said first electrical signal to inhibit said amplifying means from responding to said first electrical signals.

4. In a register control system for controlling the relationship between a moving web and an element operating thereon: means for generating electrical signals in response to the detection of identifying marks on the traveling web, means for amplifying the electrical signals including an input and an output, means for providing a negative feedback signal to the input of the said amplifying means, and means responsive to the position of the moving web for connecting said negative feedback signal to said amplifying means input to cause said amplifying means output to be maintained at a substantially zero level only during predetermined positions of the moving web.

5. In a register control system for detecting electromagnetic radiation from a moving web: means for detecting the position of the moving web, means for generating electrical signals in response to electromagnetic radiation, means for amplifying the electrical signals, including an input and an output, and means responsive to the position of the moving web for supplying a negative feedback signal to said amplifying means to cause said amplifying means output to be maintained at a substantially zero level.

References Cited

UNITED STATES PATENTS 3,195,113 7/1965 Giordano ---------- 250—202

JOHN S. HEYMAN, Primary Examiner

B. P. DAVIS, Assistant Examiner

U.S. Cl. X.R.

206—28; 250—219; 307—237